United States Patent
Reznic

(10) Patent No.: US 9,462,283 B2
(45) Date of Patent: Oct. 4, 2016

(54) EFFICIENT COMPRESSION OF BAYER IMAGES

(71) Applicant: Spotlight Technologies Ltd., Tel-Aviv (IL)

(72) Inventor: Zvi Reznic, Tel-Aviv (IL)

(73) Assignee: Spotlight Technologies Ltd., Tel-Aviv (IL)

( * ) Notice: Subject to any disclaimer, the term of this patent is extended or adjusted under 35 U.S.C. 154(b) by 373 days.

(21) Appl. No.: 14/247,280

(22) Filed: Apr. 8, 2014

(65) Prior Publication Data

US 2014/0314329 A1    Oct. 23, 2014

Related U.S. Application Data

(60) Provisional application No. 61/813,376, filed on Apr. 18, 2013.

(51) Int. Cl.
| | |
|---|---|
| *G06K 9/00* | (2006.01) |
| *H04N 19/176* | (2014.01) |
| *H04N 19/18* | (2014.01) |
| *H04N 19/39* | (2014.01) |
| *H04N 19/625* | (2014.01) |
| *H04N 19/66* | (2014.01) |

(52) U.S. Cl.
CPC ............ *H04N 19/176* (2014.11); *H04N 19/18* (2014.11); *H04N 19/39* (2014.11); *H04N 19/625* (2014.11); *H04N 19/66* (2014.11)

(58) Field of Classification Search
CPC ...... H04N 7/30; H04N 7/50; H04N 7/26244; H04N 7/26271; H04N 7/26335; G06T 7/408; G06T 7/0081; G06T 9/00; G06T 2207/10024; G06K 9/4652; G06F 17/30243
See application file for complete search history.

(56) References Cited

U.S. PATENT DOCUMENTS

| | | | |
|---|---|---|---|
| 5,446,492 A * | 8/1995 | Wolf | H04N 5/04 348/180 |
| 7,664,184 B2 | 2/2010 | Reznic et al. | |
| 7,860,180 B2 | 12/2010 | Reznic et al. | |
| 8,006,168 B2 | 8/2011 | Reznic et al. | |
| 8,116,695 B2 | 2/2012 | Feder et al. | |
| 8,254,455 B2 * | 8/2012 | Wu | H04N 19/176 375/240.16 |
| 8,259,798 B2 * | 9/2012 | Jeon | H04N 19/46 375/240.03 |
| 8,265,144 B2 * | 9/2012 | Christoffersen | H04N 19/61 375/240.1 |
| 8,559,525 B2 | 10/2013 | Reznic et al. | |
| 8,879,635 B2 * | 11/2014 | Raveendran | H04N 5/144 340/870.13 |
| 2007/0091999 A1 | 4/2007 | Nissan-Cohen et al. | |
| 2007/0177670 A1 | 8/2007 | Elnathan et al. | |

(Continued)

FOREIGN PATENT DOCUMENTS

| | | | |
|---|---|---|---|
| WO | 2008001365 A2 | 1/2008 | |
| WO | 2010049796 A2 | 5/2010 | |

*Primary Examiner* — Amir Alavi
(74) *Attorney, Agent, or Firm* — D.Kligler IP Services Ltd.

(57) ABSTRACT

A method includes, in an encoder, dividing an image into blocks, and producing respective compressed descriptions of the blocks. First data, which contains at least some of the compressed descriptions, is generated such that a compressed description of each block within the first data is accessible irrespective of the compressed descriptions of the other blocks. Second data, which contains at least a portion of the compressed descriptions or of the blocks and has a better error resilience than the first data, is also generated. The first and second data are stored in a memory. At a decoder, the first and second data are read from the memory, and the image is reconstructed from the read first and second data.

8 Claims, 3 Drawing Sheets

(56) References Cited

U.S. PATENT DOCUMENTS

| | | |
|---|---|---|
| 2007/0291855 A1 | 12/2007 | Reznic et al. |
| 2008/0086749 A1 | 4/2008 | Goldberg et al. |
| 2008/0123739 A1 | 5/2008 | Reznic et al. |
| 2009/0002379 A1* | 1/2009 | Baeza ............... G06T 1/20 345/522 |
| 2010/0123826 A1 | 5/2010 | Sagi |
| 2012/0002708 A1 | 1/2012 | Freundlich et al. |
| 2012/0105729 A1 | 5/2012 | Stopler et al. |
| 2012/0317603 A1 | 12/2012 | Stopler et al. |
| 2013/0121423 A1* | 5/2013 | Gamei ............... H04N 19/00 375/240.26 |
| 2013/0229485 A1* | 9/2013 | Rusanovskyy .... H04N 13/0048 348/43 |
| 2013/0259140 A1 | 10/2013 | Stopler |
| 2014/0168362 A1* | 6/2014 | Hannuksela ......... H04N 19/597 348/43 |
| 2014/0314329 A1* | 10/2014 | Reznic ............... H04N 19/176 382/233 |

* cited by examiner

EFFICIENT COMPRESSION OF BAYER IMAGES

CROSS-REFERENCE TO RELATED APPLICATIONS

This application claims the benefit of U.S. Provisional Patent Application 61/813,376, filed Apr. 18, 2013, whose disclosure is incorporated herein by reference.

FIELD OF THE INVENTION

The present invention relates generally to image processing and communication, and particularly to methods and systems for bandwidth-efficient representation of images.

BACKGROUND OF THE INVENTION

Various techniques for transmission of image and video data are known in the art. Some techniques involve coding prior to transmission. For example, U.S. Pat. No. 8,006,168, whose disclosure is incorporated herein by reference, describes a method for wireless transmission of video including data bytes representing components of a video block. The method includes applying transmission bit coding adapted to provide relatively greater error protection to wireless transmission bits of a wireless transmission frame corresponding to relatively higher order bits of a component byte than to those transmission bits of the transmission frame corresponding to relatively lower order bits of the component byte wherein the relatively higher order bits represent more visually significant components of the video block than do the relatively lower order bits.

As another example, U.S. Pat. No. 8,559,525, whose disclosure is incorporated herein by reference, describes techniques for wireless transmission of uncompressed HDTV video. A main portion of transform coefficients, for example the MSBs of the coefficients are sent in a coarse representation. The quantization error values, or some non-linear transformation thereof, are sent as pairs of real and imaginary portions of a complex number.

SUMMARY OF THE INVENTION

An embodiment of the present invention that is described herein provides a method including, in an encoder, dividing an image into blocks, and producing respective compressed descriptions of the blocks. First data, which contains at least some of the compressed descriptions, is generated such that a compressed description of each block within the first data is accessible irrespective of the compressed descriptions of the other blocks. Second data, which contains at least a portion of the compressed descriptions or of the blocks and has a better error resilience than the first data, is also generated. The first and second data are stored in a memory. At a decoder, the first and second data are read from the memory, and the image is reconstructed from the read first and second data.

There is additionally provided, in accordance with an embodiment of the present invention, a method including, in an encoder, receiving a color image whose pixels are divided into disjoint single-color sub-images in accordance with a predefined spatial pattern. The image is divided into blocks, and respective compressed descriptions of the blocks are produced. First data, which contains at least some of the compressed descriptions, is generated such that a compressed description of each block within the first data is accessible irrespective of the compressed descriptions of the other blocks. Second data, which contains at least a portion of the compressed descriptions or of the blocks and has a better error resilience than the first data, is also generated. The first and second data are transmitted from the encoder to a decoder. At the decoder, the first and second data are received, and the image is reconstructed from the received first and second data.

In some embodiments, the predefined spatial pattern includes a Bayer matrix pattern that divides the pixels of the color image into a red sub-image, a blue sub-image, and first and second green sub-images. In an embodiment, the pixels of the color image are divided into groups of four pixels having respective first colors, producing the compressed descriptions includes converting the groups into respective alternative groups in which the first colors are converted to respective second colors, and generating the first and second data includes including the pixels of at least one of the second colors in the second data and not in the first data.

In another embodiment, generating the second data includes generating addressing information that point to respective locations of the compressed descriptions of the blocks in the first data, and reconstructing the image includes accessing the compressed descriptions in the first data according to the addressing information received in the second data. In yet another embodiment, generating the first data includes positioning the compressed description of each block in a predefined location in the first data, irrespective of content of the image.

In still another embodiment, generating the first and second data includes producing a communication packet including a first field for the first data and a second field for the second data, such that a combined size of the first and second fields is constant up to a predefined variation. In a disclosed embodiment, compressing the image includes applying a non-standard image compression scheme at the encoder, and reconstructing the image includes converting the received first and second data into a standard compression format.

Reconstructing the image may include reconstructing the converted first and second data at the decoder using a standard image decompression scheme.

There is also provided, in accordance with an embodiment of the present invention, a system including an encoder and a decoder. The encoder is configured to divide a color image, whose pixels are divided into disjoint single-color sub-images in accordance with a predefined spatial pattern, into blocks, to produce respective compressed descriptions of the blocks, to generate first data, which contains at least some of the compressed descriptions, such that a compressed description of each block within the first data is accessible irrespective of the compressed descriptions of the other blocks, to generate second data that contains at least a portion of the compressed descriptions or of the blocks and has a better error resilience than the first data, and to transmit the first and second data. The decoder is configured to receive the first and second data and to reconstruct the image from the received first and second data.

There is further provided, in accordance with an embodiment of the present invention, a method including, in an encoder, compressing an image so as to represent multiple blocks in the image using respective first data items and second data items, such that a length of each of the second data items is determined by the length and content of the first data items. The first data items and the second data items are transmitted from the encoder to a decoder. At the decoder, the image is reconstructed from the received first data items and second data items.

In some embodiments, for a given block, the first data items include coarse compressed representations of the blocks, and the second data items include a refinement of the coarse compressed representations. In an embodiment, compressing the image includes choosing a first number of coefficients to be included in the first data items, and choosing a second number of coefficients to be included in the second data items based on the first number and on a function that is known to the encoder and the decoder, and reconstructing the image at the decoder includes deducing the second number from the received first data item using the function.

There is additionally provided, in accordance with an embodiment of the present invention, a system including an encoder and a decoder. The encoder is configured to compress an image so as to represent multiple blocks in the image using respective multiple first data items and multiple second data items, such that a length of each of the second data items is determined by the length and content of the first data items, and to transmit the first data items and the second data items. The decoder is configured to reconstruct the image from the received first data items and second data items.

There is also provided, in accordance with an embodiment of the present invention, a method including, in an encoder, compressing a signal so as to produce a plurality of numerical values in a range. The numerical values are modulated to produce a constant-envelope sequence of symbols, such that a phase of each symbol is a monotonic function of a respective numerical value. Respective bits are generated from the numerical values, by assigning each bit a first bit value if the respective numerical value falls in a sub-range of the range, and a second bit value if the respective numerical value falls outside the sub-range. The symbols and the bits are transmitted from the encoder to a decoder. At the decoder, the symbols and the bits are received, and the signal is reconstructed from the received symbols and bits.

In some embodiments, transmitting the symbols and the bits includes transmitting the symbols in a Random-Access (RA) data stream, and transmitting the bits is a High-Resilience (HR) data stream having better error resilience than the RA data stream. In an embodiment, the signal includes one of an image, an audio signal and a voice signal.

There is also provided, in accordance with an embodiment of the present invention, a system including an encoder and a decoder. The encoder is configured to compress a signal so as to produce a plurality of numerical values in a range, to modulate the numerical values to produce a constant-envelope sequence of symbols, such that a phase of each symbol is a monotonic function of a respective numerical value, to generate from the numerical values respective bits, by assigning each bit a first bit value if the respective numerical value falls in a sub-range of the range, and a second bit value if the respective numerical value falls outside the sub-range, and to transmit the symbols and the bits. The decoder is configured to receive the symbols and the bits and to reconstruct the signal from the received symbols and bits.

There is further provided, in accordance with an embodiment of the present invention, a method including, in an encoder, dividing an image into blocks, and producing respective compressed descriptions of the blocks. First data, which contains at least some of the compressed descriptions, is generated such that a compressed description of each block within the first data is accessible irrespective of the compressed descriptions of the other blocks. Second data, which contains at least a portion of the compressed descriptions or of the blocks and has a better error resilience than the first data, is also generated. The first and second data are transmitted from the encoder to a decoder. Before beginning transmission of the first and second data, at least a part of the first and second data pertaining to at least a majority of the image is written to a memory. At the decoder, the first and second data are received, and the image is reconstructed from the received first and second data.

There is additionally provided, in accordance with an embodiment of the present invention, a method including, in an encoder, receiving a signal, dividing the signal into blocks, and producing respective compressed descriptions of the blocks. First data, which contains at least some of the compressed descriptions, is generated such that a compressed description of each block within the first data is accessible irrespective of the compressed descriptions of the other blocks. Second data, which contains at least a portion of the compressed descriptions or of the blocks and has a better error resilience than the first data, is also generated. The first and second data are transmitted from the encoder to a decoder. At the decoder, the first and second data are received, and the signal is reconstructed from the received first and second data.

In some embodiments, the signal includes one of an image, an audio signal and a voice signal.

The present invention will be more fully understood from the following detailed description of the embodiments thereof, taken together with the drawings in which:

DETAILED DESCRIPTION OF EMBODIMENTS

OVERVIEW

Embodiments of the present invention that are described hereinbelow provide improved methods and systems for image (e.g., video) compression and communication. In the disclosed embodiments, an encoder compresses and transmits video images that are acquired using a color mosaic, such as the Bayer mosaic. In such images, each pixel is associated with only a single color in accordance with a predefined spatial pattern. The image can thus be viewed as being made-up of multiple interleaved single-color sub-images.

The encoder typically divides each video frame or image into blocks, compresses the blocks, and arranges the resulting compressed descriptions in two streams of data, referred to herein as a Random-Access (RA) stream and a High-Resilience (HR) stream. The RA stream is characterized in that the compressed description of each block is accessible irrespective of readout of the compressed descriptions of the other blocks. The HR stream is characterized in that it has a higher resilience to errors than the RA stream. The two streams are transmitted to a decoder, which decodes the two streams and reconstructs the video image.

By proper assignment of portions of the compressed descriptions to the RA and HR streams, the disclosed techniques are able to achieve high transmission reliability and high bandwidth efficiency. Generally speaking, information that is highly significant to the quality of the image, and/or information that is highly sensitive to errors, is typically assigned to the HR stream. Information whose loss or distortion has only a local effect, e.g., on a single block, may be assigned to the RA stream.

In some embodiments, the RA and HR streams are stored in a memory, and subsequently read from memory and decoded by the decoder. In other words, the disclosed techniques can be used for storing data in memory in compressed form. In other embodiments, the RA and HR streams are transmitted over a communication channel from a transmitter to a receiver.

Several example techniques for dividing the compressed descriptions between the two streams are described herein. Some of the partitioning schemes relate specifically to components of Bayer and Bayer-like images. Associated techniques, such as techniques for enabling random access in the RA stream using information conveyed in the HR stream, and techniques for transmitting the compressed descriptions using constant-envelope modulation, are also described.

System Description

Figure 1:
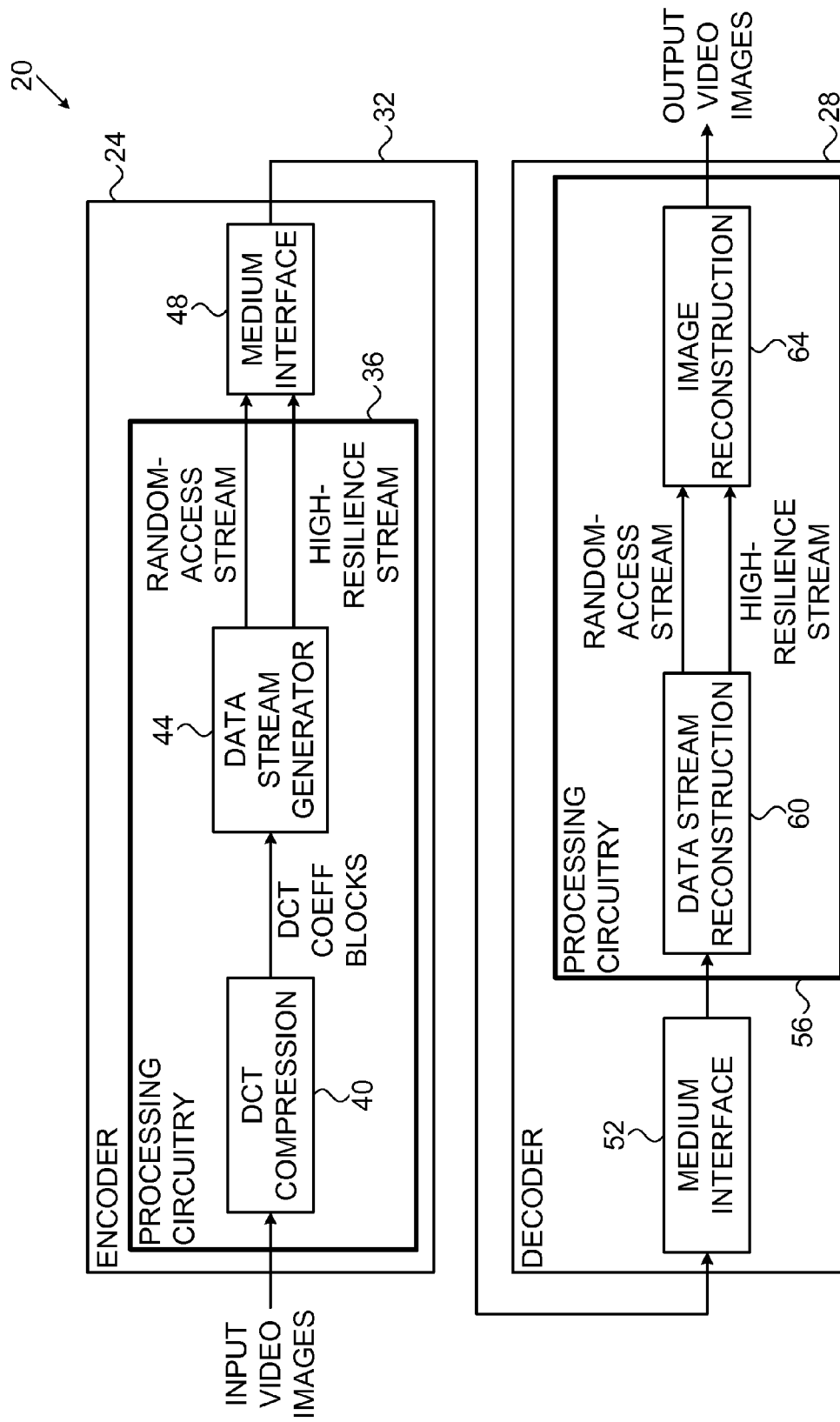
FIG. 1 is a block diagram that schematically illustrates an image compression and communication system, in accordance with an embodiment of the present invention.

FIG. 1 is a block diagram that schematically illustrates a video compression and communication system 20, in accordance with an embodiment of the present invention. System 20 comprises an encoder 24 that sends compressed video images to a decoder 28 over a medium 32. Medium 32 may comprise any suitable medium, such as a cable connection, a wireless channel or even a disk storage medium. Systems such as system 20 can be used in a wide variety of applications, such as, for example, in miniature medical intra-body devices that acquire and transmit video images inside a patient body.

In the present example, encoder 24 comprises processing circuitry 36, which receives and processes input images or video frames from a camera (not shown in the figure). In some embodiments, the input images comprise color images that are formatted in accordance with the Bayer mosaic format. The Bayer mosaic is described, for example, in U.S. Pat. No. 3,971,065, whose disclosure is incorporated herein by reference. In this format, each image in the color image is assigned a single color, in accordance with a predefined spatial pattern, also referred to as a mosaic. The image can thus be viewed as being made-up of multiple disjoint single-color sub-images, which are interleaved with one another. Although the description that follows refers mainly to Bayer mosaic images, the disclosed techniques can be used with any other suitable format.

In encoder 24, processing circuitry 36 divides each input video image into blocks. A Transform compression unit 40 applies Transform compression, in the present example Discrete Cosine Transform (DCT) compression, so as to produce respective compressed descriptions of the blocks. Unit 40 thus outputs blocks of DCT coefficients. In alternative embodiments, however, any other suitable type of compression can be used. The compressed description of a block is also referred to herein simply as a "compressed block" for the sake of clarity.

The compressed descriptions of the blocks are processed by a data stream generator 44. The data stream generator produces, for each image, two streams of data that are referred to herein as a Random-Access (RA) stream and a High-Resilience (HR) stream.

The RA stream comprises at least some of the compressed descriptions, and it is random-access in the sense that a compressed description of each block is accessible irrespective of readout of the compressed descriptions of the other blocks. Several example techniques for implementing the random-access property are described below.

The HR stream comprises at least a portion of the compressed descriptions or the blocks, and has better error resilience than the RA stream. For example, generator 44 may encode the RA stream with an Error Correction Code (ECC) having a certain rate, and the HR stream with an ECC having a lower rate.

The RA and HR streams are provided to a medium interface 48, which modulates the data on an analog signal and transmits the modulated analog signal over medium 48. When medium 32 comprises a cable or wireless channel, for example, medium interface 48 comprises a Radio Frequency (RF) transmitter that modulates the two data streams on one or more RF carriers.

Decoder 28 comprises a medium interface 52 and processing circuitry 56. Medium interface 52 receives the analog signal transmitted from encoder 24 over medium 32. When medium 32 comprises a cable or wireless channel, for example, medium interface 52 comprises an RF receiver that down-converts and demodulates the received signal. Processing circuitry 56 processes the received signal so as to reconstruct and output the video images.

In the example of FIG. 1, processing circuitry 56 comprises a data stream reconstruction unit 60 that reconstructs the RA and HR streams described above, and an image reconstruction unit 64 that reconstructs the images or video frames from the two streams. Unit 64 typically reconstructs the compressed descriptions of the blocks of the image (e.g., the DCT coefficient blocks produced by unit 40 in the encoder), and then decompresses the compressed descriptions (e.g., by applying Inverse DCT-IDCT). The reconstructed images or video frames are provided as output of decoder 28.

The configurations of encoder 24 and decoder 28 shown in FIG. 1 are example configurations, which are chosen purely for the sake of conceptual clarity. In alternative embodiments, any other suitable encoder and/or decoder configurations can be used.

For example, in some embodiments, image reconstruction unit 64 in the decoder converts the RA and HR streams into compressed blocks that comply with some standard compression format, e.g., JPEG, MPEG or BMP (even though the compression at the encoder side may not be standard). Unit 64 then outputs the standard-compliant compressed blocks to an external standard decompression unit, which performs decompression and outputs the video images. In this manner, decoder 28 may operate in conjunction with standard (e.g., JPEG) image decompression circuitry, even though the compression and transmission scheme applied by encoder 24 is non-standard. As another example, in some embodiments, the RA and HR streams (or at least part of the two streams pertaining to a majority of the image) are written to a memory of the encoder before beginning transmission to the decoder.

Although the embodiments described herein refer mainly to video applications, the disclosed techniques can be used for compression and communication of various other types of signals, e.g., still images or audio signals including voice signals. In the present context, video frames are regarded as a type of images, and the terms "frames," "video frames" and "images" are used interchangeably.

The different elements of encoder 24 and decoder 28 may be implemented using any suitable hardware, such as in an Application-Specific Integrated Circuit (ASIC) or Field-Programmable Gate Array (FPGA). In some embodiments, some elements of encoder 24 and/or decoder 28 can be implemented using software, or using a combination of hardware and software elements.

In some embodiments, certain elements of processing circuitry 36 in the encoder and/or processing circuitry 56 in the decoder is implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

Figure 2:
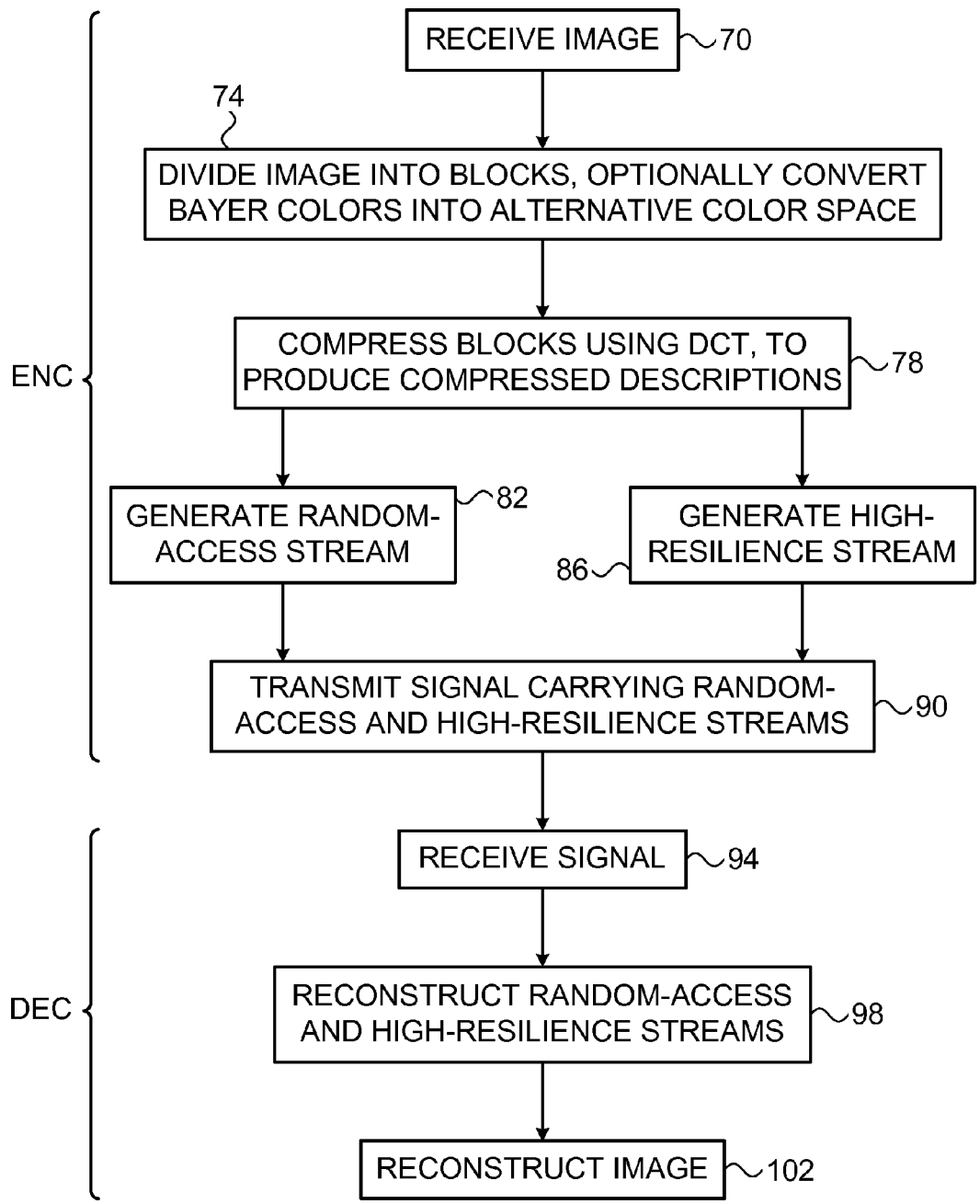
FIGS. 2 and 3 are flow charts that schematically illustrate methods for image compression and communication, in accordance with embodiments of the present invention.

Compression and Communication Using Random-Access and High-Resilience Data Streams FIG. 2 is a flow chart that schematically illustrates a method for video compression and communication, in accordance with an embodiment of the present invention. The method begins with encoder 24 receiving a Bayer or Bayer-like color video image, at an image input step 70. The method description refers to a single video image for the sake of clarity. This method it typically repeated for each image in an input video stream.

Processing circuitry 36 in the encoder divides each single-color sub-image of the color image into blocks, at a block division step 74. Optionally, the processing circuitry may convert the colors into an alternative color space. For example, a Bayer image comprises four interleaved sub-images—a red (R) sub-image, a blue (B) sub-image and two green sub-images (G1, G2). The processing circuitry may convert the R, B, G1 and G2 pixel data into Y, Cr, Cb and C4, wherein $$\begin{bmatrix} Y \\ Cr \\ Cb \end{bmatrix} = \begin{bmatrix} 0.299 & 0.587 & 0.114 \\ 0.5 & -0.42 & -0.0818 \\ -0.169 & -0.331 & 0.5 \end{bmatrix} \begin{bmatrix} R \\ G1 \\ B \end{bmatrix}$$

and

C4=ƒ(R,G1,B,G2) for some function ƒ(·).

The output of step 74, with or without color-space conversion, is a plurality of single-color blocks of pixels, e.g., 8-by-8 pixel blocks.

Transform compression unit 40 compresses the blocks, at a compression step 78, so as to produce a plurality of Transform (e.g., DCT) coefficient blocks. The coefficient blocks are referred to herein as compressed descriptions of the original blocks of the image. Alternatively to transform compression, various other suitable compression schemes can be used to produce the compressed descriptions.

Data stream generator 44 uses the compressed descriptions to generate a Random-Access (RA) stream at a RA stream generation step 82, and a High-Resilience (HR) stream at a HR stream generation step 86. Several examples of constructing the RA and HR streams are described further below.

Typically, generator 44 encodes the two data streams with ECC, such that the HR stream has better error resilience than the RA stream (usually at the expense of larger data overhead). For example, the HR stream may be encoded with a higher code rate relative to the RA stream. In an alternative embodiment, the HR stream may be encoded with ECC while the RA stream is left uncoded.

Medium interface 48 in encoder 24 modulates the RA and HR streams onto an analog signal, and transmits the signal over medium 32, at a transmission step 90. When medium 32 comprises a wireless channel, for example, medium interface 48 typically modulates the RA and HR streams, either jointly or separately, onto one or more RF carriers.

In decoder 28, medium interface 52 receives and demodulates the transmitted signal, at a reception step 94, and provides the demodulated signal to processing circuitry 56. Data stream reconstruction unit 60 reconstructs the RA and HR streams from the signal, at a stream reconstruction step 98. The stream reconstruction typically involves, among other functions, decoding of the ECC that encodes the streams.

Image reconstruction unit 64 reconstructs the color video image from the RA and HR streams, at an image reconstruction step 102. Image reconstruction typically involves reconstruction of the compressed descriptions (e.g., DCT coefficient blocks), and decompression (e.g., IDCT). The reconstructed color image is provided as output of decoder 28.

System 20 may use various techniques for constructing the RA and HR streams. In some embodiments, the location of each compressed block in the RA stream is fixed and predefined, regardless of the content of the compressed block or of other compressed blocks. This fixed-location structure enables unit 60 in the decoder to access any desired compressed block in a random-access, non-sequential manner.

In alternative embodiments, the locations of the compressed blocks in the RA stream may vary, e.g., depending on content. In order to meet the random-access requirement, generator 44 in the encoder produces a list of pointers that indicate the locations of the compressed blocks in the RA stream, and transmits the pointers in the HR stream. At the decoder, unit 60 extracts the pointers from the HR stream, and uses the pointers to access any desired compressed block in the RA stream. Alternatively to using explicit pointers, any other suitable addressing information can be used.

Additionally or alternatively, system 20 may use various techniques for dividing the information in the compressed descriptions between the RA and HR streams. Generally speaking, information that is highly significant to the quality of the image, and/or information that is highly sensitive to errors, is typically assigned to the HR stream. Information whose loss or distortion has only a local effect, e.g., on a single block, may be assigned to the RA stream. This sort of partitioning provides a good trade-off between bandwidth efficiency and robustness to errors.

For example, generator 44 in encoder 24 may partition the compressed description such that some color information is included in the RA stream, and other color information is included in the HR stream. Consider, for example, a Bayer image that is represented by a red (R) sub-image, a blue (B) sub-image and two green sub-images (G1, G2).

In some embodiments, the transform compression may convert the colors to another color space, e.g., with the four colors Y, Cr, Cb and C4 as defined above. Generator 44 may send the DCT coefficients of Y, Cr and Cb in the RA stream, and C4 (which may be a function of only G1 and G2) blocks in the HR stream. The underlying assumption behind this partitioning is that in Y, Cr and Cb, the high spatial frequencies may be omitted prior to transmission (and thus save bandwidth), whereas in C4, a different type of compression will be required.

In one example embodiment, generator 44 may send in the HR stream a plurality of DCT-compressed G1 and G2 blocks. Alternatively, generator 44 may send the green color information in the HR stream using some function that does not necessarily involve compression. For example, generator 44 may calculate differences between respective G1 and G2 blocks, and transmit the differences in the HR stream.

In another embodiment, generator 44 may convert the R, B and G colors into respective alternative colors. In a Bayer mosaic, for example, the color image is divided into 2-by-2 groups of pixels, such that the diagonal elements of each group comprise the G1 and G2 pixels, and the remaining two pixels comprise the R and B pixels. In an embodiment, generator 44 may convert the R, B and G colors into respective alternative colors, and transmit the compressed descriptions of at least one of these colors in the HR stream but not in the RA stream.

Further alternatively, system 20 may use any other suitable partitioning of information between the RA and HR streams.

In some embodiments, data stream generator 44 produces, for each video image, a communication packet that comprises the RA and HR streams. The packet size is fixed, or at least constrained to a maximum length, up to some predefined allowed variation. A typical allowed variation may be on the order of 5%. Typically, the payload of such a packet comprises a first field for the RA stream and a second field for the HR stream. The size of the first and second fields (i.e., the data sizes allocated to the RA and HR streams) may vary from one packet to another (i.e., from one video image to another), as long as the total size of the payload (i.e., the combined data size of the RA and HR streams) is kept constant (or at least does not exceed a maximum total size).

The above configuration trades the data size of the RA stream vs. the data size of the HR stream, since their sum is constrained. In an example embodiment, generator 44 first sets the required size of the HR stream, and then derives the remaining allowed size for the RA stream. In an embodiment, the remaining allowed size of the RA stream is fed back to compression unit 40, and used to adapt the compression ratio (or compression depth) applied by unit 40. In an embodiment, the packet may comprise an explicit indication of the lengths of the two fields.

Random Access of Variable-Length Compressed Descriptions, with Implicit Length Indications In some embodiments, compression unit 40 in encoder 24 produces variable-length compressed descriptions (e.g., variable-length DCT coefficient blocks). Data stream generator 44 generates a Random-Access (RA) stream, in which the locations of the compressed descriptions are not fixed or predefined. Nevertheless, for at least some of the compressed descriptions, the decoder is able to carry out random access without a need for explicit pointers or length indications.

In an example embodiment, processing circuitry 36 in the encoder carries out the following process:

Unit 40 compresses the image using a DCT-based low-rate compression scheme (e.g., JPEG). For each block, the resulting DCT coefficients are ordered in some known order (e.g., progressing in two dimensions from the DC corner coefficient).

Let L denote the order of the last non-zero coefficient in the low-rate compression of the block. (In JPEG and MPEG this coefficient will typically be followed by an End-Of-Block (EOB) indication). Let the "full additional description" denote the difference between the DCT coefficients of the original block and the DCT coefficients of the low-rate-compressed block, thus forming a refinement of the low-rate-compressed block. Let f( ) denote a predetermined monotonically non-decreasing function, which is agreed-upon between encoder 24 and decoder 28.

Stream generator 44 in the encoder orders the coefficients of the "full additional description" in the same order used for ordering the L low-rate coefficients, and transmits the first f(L) coefficients. This transmitted sequence is referred to as the "transmitted additional description."

The decoder is assumed to receive the low-rate compression correctly including the value of L, and is also aware of f( ). Using this information, the decoder is able to calculate f(L), for the block, even though the length information f(L) was never transmitted explicitly.

Using this scheme, the encoder and the decoder are able to communicate a variable-length additional description, in which there is no need to waste communication overhead on indicating the additional description length.

In some embodiments, encoder 24 transmits the low-rate compression (e.g., the strongest DCT coefficients) in the HR stream, and the "transmitted additional description" in the RA stream.

System 20 may carry out various variations of this scheme. For example, f(L) may be used as a predictor, which is common to encoder 24 and decoder 28. The encoder may decide to transmit a different number N of DCT coefficients (N≠f(L)). In such a case, the encoder adds the value of N−f(L) to the HR stream. The number N−f(L) will typically have low entropy, and can be compressed.

As another example, when compressing a color image having multiple colors (e.g., RGB or YUV), compression unit 40 produces three low-rate descriptions L1, L2, and L3, and three variable-length transmitted additional descriptions, per block. In this embodiment, three pre-defined functions f1(L1, L2, L3), f2(L1, L2, L3) and f3(L1, L2, L3) can be used instead of the single function f( ). The above scheme typically performs better than using F1(L1), f2(L2) and f3(L3), since L2 and L3 may be very small numbers, e.g., '0' or '1' in many of the blocks.

In another embodiment, the encoder may order the DCT coefficients of all three colors (for both the low-rate compression and the additional description) in one order, and use a single f( ) function. The above schemes can be generalized as follows: The encoder compresses an image so as to represent multiple blocks in the image using respective first data items (e.g., using only the strongest DCT coefficients) and second data items (e.g., smaller-amplitude coefficients).

In this representation, the length of each second data item (e.g., sequence of smaller-amplitude coefficients for a given block) is determined by the length of the corresponding first data item (e.g., sequence of the strongest coefficients for the given block) and the content of the corresponding first data item. The encoder transmits the first and second data items to the decoder, and the decoder reconstructs the image from the received first and second data items.

Compression and Communication Using Constant-Envelope Modulation

In some applications, it is highly desirable that the signal transmitted over medium 32 has a constant complex envelope. Thus, in some embodiments, processing circuitry 36 of encoder 24 modulates the compressed descriptions of the blocks so as to produce a stream of constant-envelope symbols.

Figure 3:
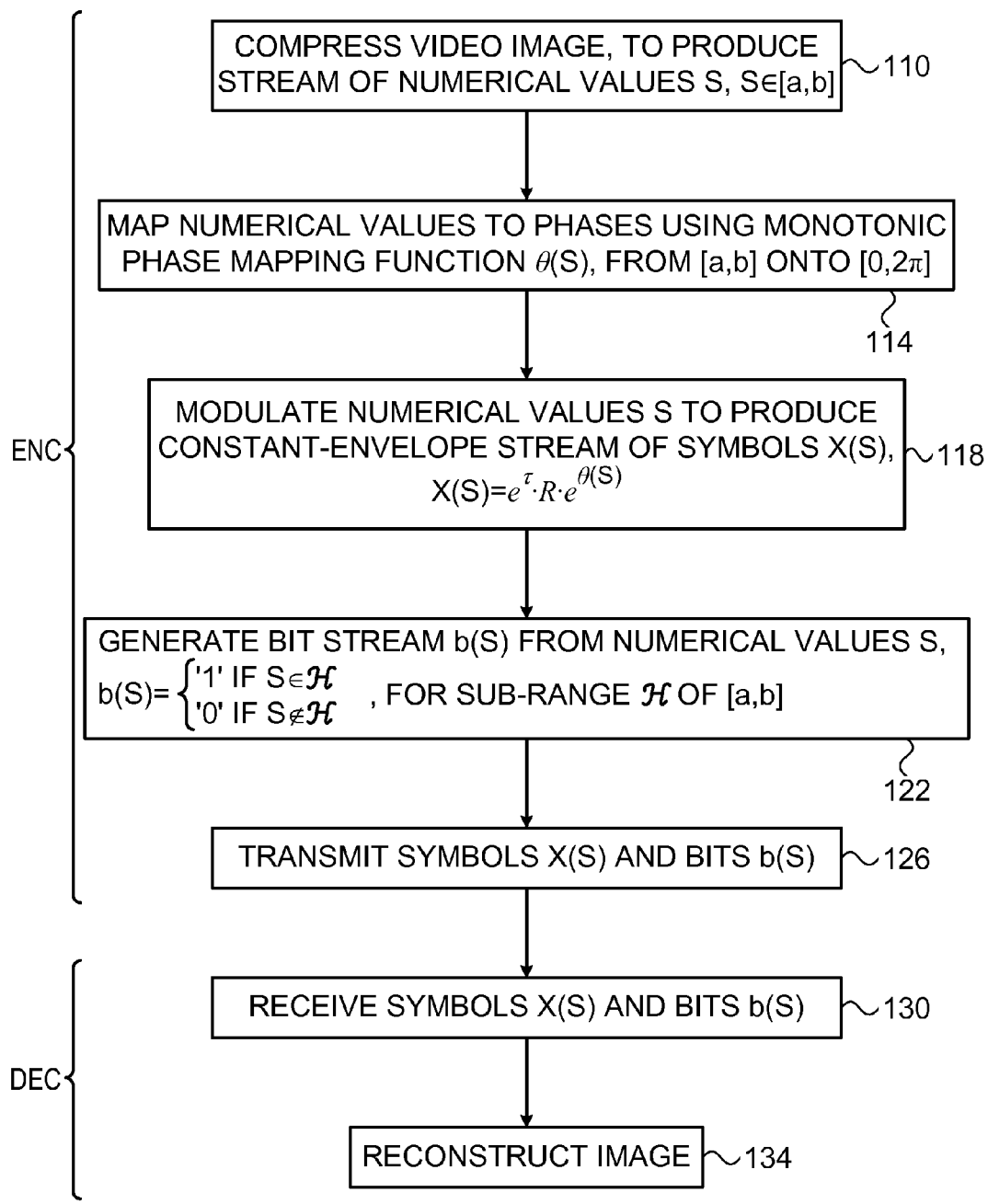

FIG. 3 is a flow chart that schematically illustrates a method for video compression and communication, in accordance with an alternative embodiment of the present invention. The method begins with compression unit 40 compressing an input video image, at a compression step 110. In this embodiment, the compressed description of the image comprises a stream of numerical values denoted S. The values of S fall in a finite range of values [a, b], i.e., S∈[a, b].

Circuitry 36 maps the numerical values S values to respective phases θ(S), θ(S)∈[0,2π], at a phase mapping step 114. The mapping function θ(S) is monotonic. In other words, θ(S) is a monotonic function that maps the interval [a,b] onto the interval [0,2π]. At a modulation step 118, circuitry 36 phase-modulates the numerical values S, so as to produce a constant-envelope stream of symbols X(S) $=e^{\tau} \cdot R \cdot e^{\theta(S)}$, wherein R and τ denote predefined constants.

The modulated signal X(S) has a constant envelope and therefore lends itself to efficient transmission. The mapping of [a,b] onto [0,2π], however, may suffer from severe wraparound-related errors. Consider, for example, a numerical value S that is very close to a, i.e., close to the edge of interval [a,b]. This numerical value is mapped to a symbol X(S) whose phase θ(S) is very close to zero. Due to channel noise or other distortion, there is high likelihood that the decoder will decode this phase as high positive (slightly below 2π), resulting in a severe error. A similar error may occur for numerical value S that are very close to b.

In order to minimize the risk of such wraparound-related errors, processing circuitry 36 in the encoder generates an additional bit stream denoted b(S), at a bit stream generation step 122. Each bit b(S) corresponds to a respective symbol X(S), and serves as side information that assists decoder 28 in demodulating the symbol.

In an example embodiment, b(S) is set to a certain bit value if the corresponding numerical value S falls in some sub-range H of interval [a,b], and vice versa. The sub-range may be pre-defined, or it may be conveyed implicitly or explicitly to the decoder. For example, b(S) can be written as $$b(S) = \begin{cases} \text{'1'} & \text{if } S \in \mathcal{H} \\ \text{'0'} & \text{if } S \notin \mathcal{H} \end{cases}.$$

With a properly chosen sub-range H, b(S) can mitigate the above-described wraparound problem. Consider, for example, an embodiment in which the mapping θ(S) is θ(S)=2π·(s−a)/(b−a), and H is chosen as the lower half of interval [a, b], i.e., H=[a,(a+b)/2]. If a symbol is received with a (possibly noisy) phase in the vicinity of zero (or, equivalently, in the vicinity of 270, b(S)='1' indicates with high likelihood that the correct phase is slightly above zero, and b(S)='0' indicates with high likelihood that the correct phase is slightly below 2π. The choice of sub-range H above is depicted purely by way of example. In alternative embodiments, any other suitable sub-range can be used.

In a transmission step 126, encoder 24 transmits the stream of symbols X(S) and the stream of bits b(S) to decoder 28. In some embodiments, the stream of symbols X(S) is used for transmitting the Random Access (RA) data stream described in FIGS. 1 and 2 above, and the stream of bits b(S) is transmitted as part of the High-Resilience (HR) stream. This partitioning, however, is not mandatory, and symbols X(S) and bits b(S) may be transmitted in any other suitable way. In some embodiments, the stream of bits b(S) is transmitted in some suitable compressed form.

At a reception step 130, decoder 28 receives the stream of symbols X(S) and the stream of bits b(S). At a reconstruction step 134, processing circuitry 56 in the decoder reconstructs the video image from the received symbols X(S) and bits b(S).

Although the embodiments described herein mainly address image and video communication, the methods and systems described herein can also be used in other applications, such as in audio and voice transmission.

It will thus be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A system, comprising:
   an encoder, which is configured to divide a color image, whose pixels are divided into disjoint single-color sub-images in accordance with a predefined spatial pattern, into blocks, to produce respective compressed descriptions of the blocks, to generate first data, which contains at least some of the compressed descriptions, such that a compressed description of each block within the first data is accessible irrespective of the compressed descriptions of the other blocks, to generate second data that contains at least a portion of the compressed descriptions or of the blocks and has a better error resilience than the first data, and to transmit the first and second data; and
   a decoder, which is configured to receive the first and second data and to reconstruct the image from the received first and second data.

2. The system according to claim 1, wherein the predefined spatial pattern comprises a Bayer matrix pattern that divides the pixels of the color image into a red sub-image, a blue sub-image, and first and second green sub-images.

3. The system according to claim 1, wherein the pixels of the color image are divided into groups of four pixels having respective first colors, and wherein the encoder is configured to convert the groups into respective alternative groups in which the first colors are converted to respective second colors, and to include the pixels of at least one of the second colors in the second data and not in the first data.

4. The system according to claim 1, wherein the encoder is configured to generate in the second data addressing information that point to respective locations of the compressed descriptions of the blocks in the first data, and wherein the decoder is configured to reconstruct the image by accessing the compressed descriptions in the first data according to the addressing information received in the second data.

5. The system according to claim 1, wherein the encoder is configured to position the compressed description of each block in a predefined location in the first data, irrespective of content of the image.

6. The system according to claim 1, wherein the encoder is configured to produce a communication packet comprising a first field for the first data and a second field for the second data, such that a combined size of the first and second fields is constant up to a predefined variation.

7. The system according to claim 1, wherein the encoder is configured to compress the image by applying a non-standard image compression scheme, and wherein the decoder is configured to reconstruct the image by converting the received first and second data into a standard compression format.

8. The system according to claim 7, wherein the decoder is configured to reconstruct the converted first and second data using a standard image decompression scheme.

\* \* \* \* \*